US011556253B1

United States Patent
BenHanokh et al.

(10) Patent No.: US 11,556,253 B1
(45) Date of Patent: Jan. 17, 2023

(54) REDUCING POWER CONSUMPTION BY SELECTIVE MEMORY CHIP HIBERNATION

(71) Applicant: RED HAT, INC., Raleigh, NC (US)

(72) Inventors: Gabriel Zvi BenHanokh, Tel-Aviv (IL); Brett Niver, Grafton, MA (US); Mark Nelson, Minnetonka, MN (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/381,566

(22) Filed: Jul. 21, 2021

(51) Int. Cl.
*G06F 3/06* (2006.01)
(52) U.S. Cl.
CPC .......... *G06F 3/0625* (2013.01); *G06F 3/0604* (2013.01); *G06F 3/0647* (2013.01); *G06F 3/0659* (2013.01); *G06F 3/0683* (2013.01)
(58) Field of Classification Search
CPC .... G06F 3/0625; G06F 3/0604; G06F 3/0647; G06F 3/0659; G06F 3/0683; G06F 1/3275
See application file for complete search history.

(56) References Cited

U.S. PATENT DOCUMENTS

| | | | |
|---|---|---|---|
| 8,045,494 B2 | 10/2011 | Habetha et al. | |
| 8,443,211 B2 | 5/2013 | Zhao et al. | |
| 9,207,869 B2 | 12/2015 | Salomon et al. | |
| 9,436,251 B2 | 9/2016 | Cooper et al. | |
| 2007/0011421 A1* | 1/2007 | Keller | G06F 1/3275 713/320 |
| 2016/0147572 A1* | 5/2016 | Reed | G06F 9/5022 718/104 |
| 2017/0228012 A1* | 8/2017 | Shirota | G06F 1/329 |

OTHER PUBLICATIONS

Zhong et al., Building NVRAM-Aware Swapping Through Code Migration in Mobile Devices, 2017, IEEE, 11pages (Year: 2017).*
Bostoen, T., et al., "Power-reduction techniques for data-center storage systems," ACM Journals, 2013, https://dl.acm.org/doi/abs/10.1145/2480741.2480750.
Freitas, R.F., et al., "Storage-Class Memory: The Next Storage System Technology," IBM Journal of Research and Development, 2008, https://www.researchgate.net/publication/224102830_Storage-Class_Memory_The_Next_Storage_System_Technology.
Park, H., et al., "Exploiting Storage Class Memory to reduce energy consumption in mobile multimedia devices," IEEE, Jan. 2010, https://ieeexplore.ieee.org/abstract/document/5418811.

* cited by examiner

*Primary Examiner* — Gary W. Cygiel
(74) *Attorney, Agent, or Firm* — Kilpatrick Townsend & Stockton LLP (57) ABSTRACT

Power consumption can be reduced by selective memory chip hibernation. For example, a computing device can allocate first data associated with a first processing operation of a user device to a first chip of a dynamic random access memory (DRAM) of the user device. The computing device can allocate second data associated with a second processing operation of the user device to a second chip of the DRAM of the user device. The computing device can determine the first processing operation has been inactive for a predetermined period of time and migrate the first data from the first chip of the DRAM to a storage device of the user device. The computing device can hibernate the first chip of the DRAM while maintaining power to the second chip of the DRAM for continuing to perform the second processing operation.

20 Claims, 5 Drawing Sheets

REDUCING POWER CONSUMPTION BY SELECTIVE MEMORY CHIP HIBERNATION

TECHNICAL FIELD

The present disclosure relates generally to computing device power consumption. More specifically, but not by way of limitation, this disclosure relates to reducing power consumption by selective memory chip hibernation.

BACKGROUND

User devices, such as mobile phones, laptop computers, and desktop computer, often include a dynamic random access memory (DRAM). A bit of data can be stored in a memory cell of the DRAM, and each memory cell can include a capacitor and a transistor. The charge of the capacitor dissipates over time, which can lead to data being lost. To prevent losing data, DRAMs typically include a memory refresh circuit that periodically rewrites the data in the capacitor to restore the initial charge.

User devices can also support multiple applications or other processes at a single time. One application or process can be considered a foreground, or active, process, while other applications or processes can be considered background, or inactive, processes. Data associated with background processes can be paged out to a storage device after an extended period of inactivity.

DETAILED DESCRIPTION

A dynamic random access memories (DRAM) of a user device can consume a large amount of battery power as a result of continuously refreshing the DRAM. Data from processes running on the user device is typically distributed randomly across chips of the DRAM. So, if even one process is active on the user device while all others are inactive, the DRAM receives full power to keep refreshing the data, resulting in the large power consumption. To save power, when the user device becomes inactive, data from the DRAM can be moved into a storage device, such as a solid-state drive (SSD) or a hard disk drive (HDD). The whole DRAM can then be hibernated or shut down until the user device resumes activity. Moving data to a storage device may occur many minutes after the process becomes inactive to reduce a cost associated with HDD usage or write amplification for an SSD.

Some examples of the present disclosure can overcome one or more of the abovementioned problems by providing a system that can selectively hibernate chips of a DRAM to conserve battery power. For example, the system can allocate first data associated with a first processing operation of a user device to a first chip of a DRAM of the user device. The system can allocate second data associated with a second processing operation of the user device to a second chip of the DRAM of the user device. Each processing operation can be allocated to a different chip of the DRAM. The system can determine the first processing operation has been inactive for a predetermined period of time. The predetermined period of time may be based on a type of processing operation that the second processing operation corresponds to or on a type of storage device included in the user device. For example, the predetermined period of time may be ten seconds. The system can migrate the first data from the first chip of the DRAM to a storage device of the user device. The storage device may be a storage-class memory (SCM), an SSD, an HDD, etc. The system can then hibernate the first chip of the DRAM while maintaining power to the second chip of the DRAM for continuing to perform the second processing operation. Allocating memory for each processing operation to a different chip of the DRAM allows the chips to be individually powered. Thus, only chips of the DRAM being used for active processing operations can receive full power, which can reduce battery power consumed by the DRAM and extend battery life of the user device.

As an example, a mobile phone can have two applications open. The mobile phone can allocate data associated with the first application to a first chip of the DRAM of the mobile phone and data associated with the second application to a second chip of the DRAM. A user may switch to displaying the second application, while still having the first application open in the background. While running in the background, the first application can be considered to be inactive. Once the first application has been inactive for ten seconds, the mobile phone can move the data of the first application to an SCM of the mobile phone. Since there is no data remaining in the first chip that needs to be regularly refreshed, the mobile phone can hibernate the first chip. But, the mobile phone can maintain power to the second chip so that the second application can continue executing without losing data. As a result of the data allocation and movement to an SCM, battery power of the mobile phone can be conserved.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
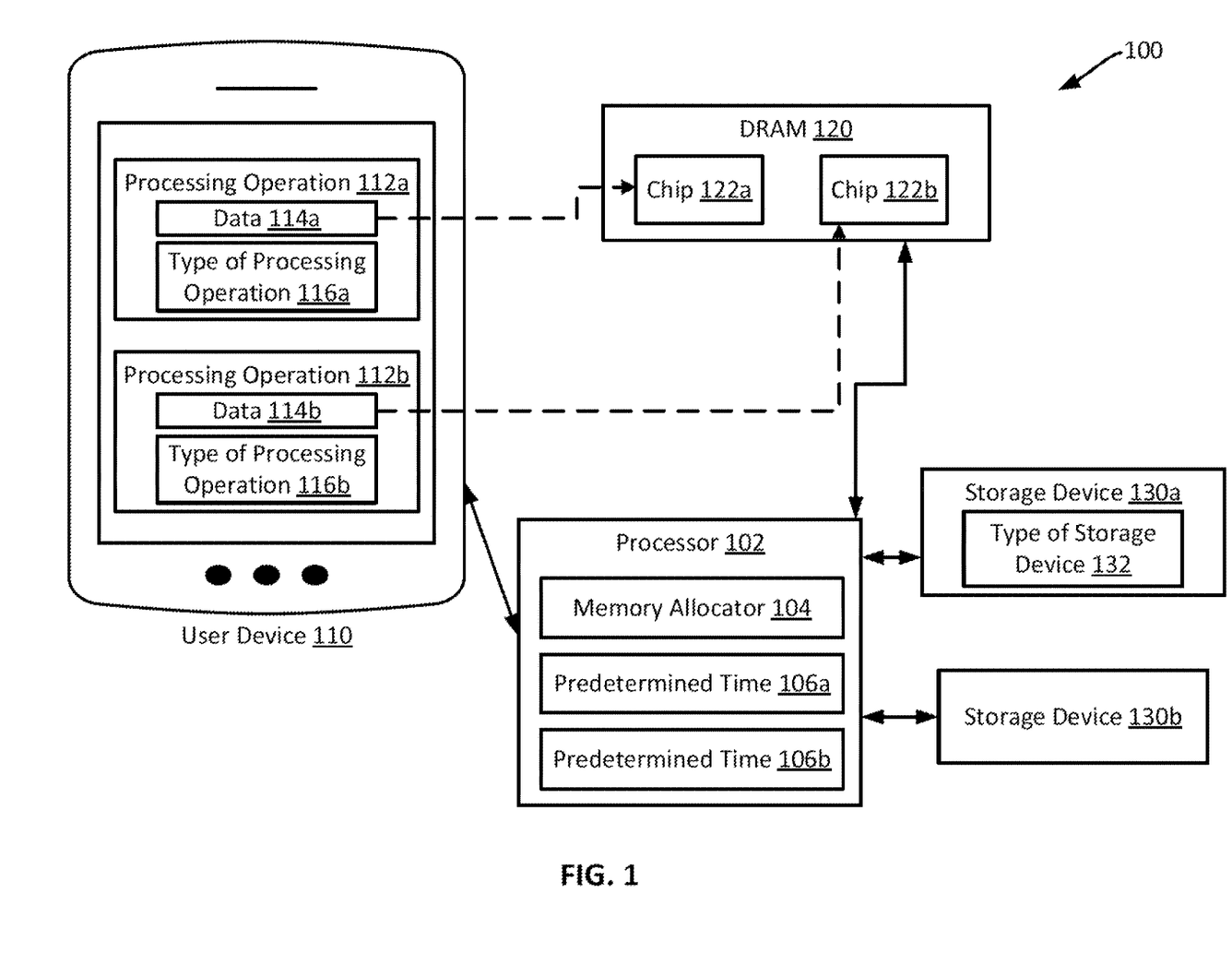
FIG. 1 is a block diagram of an example of a system for implementing power consumption reduction by selective memory chip hibernation according to some aspects of the present disclosure.

FIG. 1 is a block diagram of an example of a system 100 for implementing power consumption reduction by selective memory chip hibernation according to some aspects of the present disclosure. The system 100 can include a user device 110 that can perform processing operations 112*a-b*. The user device 110 can include, or be in communication with, a processor 102, a dynamic random access memory (DRAM) 120, and one or more storage devices 130*a-b*. Although the user device 110 is shown as a mobile phone in FIG. 1, other examples may include a laptop computer, a desktop computer, a tablet, a server, or another user device.

In some examples, the processor 102 includes a memory allocator 104 that allocates data 114*a-b* from processing operations 112*a-b* of the user device 110 to chips 122*a-b* of the DRAM 120. Examples of the processing operations 112a-b can include any process running on the user device 110, such as a software application or a tab of a webpage in a browser. The user device 110 can execute multiple processing operations at a time, for example, running multiple webpages in a browser or having multiple software applications open at once. The memory allocator 104 can allocate the data 114a associated with the processing operation 112a to the chip 122a and the data 114a associated with the processing operation 112b to the chip 122b. This allocation can allow all of the data associated with a processing operation to be stored in a single, known location on the DRAM 120, rather than being randomly distributed across the chips. If a size of the data exceeds the available space on the chip, the memory allocator 104 may allocate additional space for the data on another chip of the DRAM 120.

At some point in time, the processing operation 112a may become inactive. The processor 102 can determine inactivity based on the processing operation 112a being in a state in which actions cannot be received. For example, if the processing operation 112a is a webpage displayed in a tab of a browser that also includes other tabs displaying other webpages, the processor 102 may determine that the processing operation 112a becomes inactive after the browser has been minimized or another tab has been displayed for a predefined period of time (e.g., one second). If the processing operation 112a is not resumed within the predefined period of time, the processor 102 can determine the processing operation 112a is inactive.

If the processing operation 112a becomes inactive and another processing operation, such as the processing operation 112b, becomes or remains active, the processor 102 can selectively hibernate the DRAM 120 to reduce power consumption. The processor 102 may wait for the processing operation 112a to be inactive for a predetermined time 106a before selectively hibernating the DRAM 120. This can reduce moving data out of the DRAM 120 during a time period in which the processing operation 112a may resume activity. The predetermined time 106a may be the same for all processing operations, or may be based on a type 116b of the processing operation 112b that is active while the processing operation 112a is inactive. For example, if the processor 102 determines the type 116b corresponds to a webpage of a news article, the processor 102 may determine that the predetermined time 106a is longer than if the type 116b corresponds to a webpage of a conference call. A news article may be associated with a shorter active time, meaning that the processing operation 112a may resume activity more quickly than if the processing operation 112b were a conference call. Thus, the predetermined time 106a for the news article can be longer so that the data 114b remains in the DRAM 120 in case the processing operation 112a resumes activity.

Additionally or alternatively, the predetermined time 106a may be based on a type of storage device 132 of the storage device 130a of the user device 110. Examples of the type of storage device 132 include a storage-class memory (SCM), a solid-state drive (SSD), a hard disk drive (HDD), etc. Storage devices associated with a longer time to receive, store, and move data, such as SSDs and HDDs, may be associated with a longer predetermined time 106a. Since SCMs may be able to receive and send data more quickly, hibernating and resuming chips on the DRAM 120 may be performed faster if the storage device 130a is an SCM than if the storage device 130a is an SSD or an HDD. Thus, the predetermined time 106a can be shorter (e.g., 10 seconds rather than 30 seconds) for an SCM, so that a user of the user device 110 is less likely to experience an interruption if the processing operation 112a is resumed.

Subsequent to the processing operation 112a being inactive for the predetermined time 106a, the processor 102 can migrate the data 114a that is stored on the chip 122a to the storage device 130a of the user device 110. The data 114a can remain in the storage device 130a until the processing operation 112a is resumed, or until the storage device 130a receives a command to delete the data 114a. With the data 114a in the storage device 130a, the processor 102 can hibernate the chip 122a, which may involve removing some or all of the power from the chip 122a. But, the processor 102 can maintain power to the chip 122b, such that the processing operation 112b may continue to perform. For example, the processing operation 112a can be a first webpage running in a first tab in a browser on the user device 110 and the processing operation 112b can be a second webpage running in a second table in the browser on the user device 110. The user device 110 can have the processing operation 112a minimized and the processing operation 112b displayed on the user interface of the user device 110 for the predetermined time 106a. The processor 102 can move the data 114a of the first tab to the storage device 130a and maintain the data 114b of the second tab in the chip 122b of the DRAM 120. The processor 102 can then hibernate the chip 122a and maintain power to the chip 122b with the data 114b, so that the second tab can continue execution. This can save batter power of the user device 110, since only active processes may consume power of the DRAM 120.

In some examples, subsequent to the data 114a being stored in the storage device 130a, the processor 102 can determine that the processing operation 112a becomes active. The processor 102 can migrate the data 114a from the storage device 130a to the chip 122a. The processor 102 can then resume power to the chip 122a. Resuming power may involve resuming full power to the chip 122a from a reduced-power state associated with the hibernation.

Some examples may make use of multiple storage devices of the user device 110 to further improve storage performance of the user device 110. For example, the user device 110 can include storage devices 130a-b. The storage device 130b may be a slower and less expensive storage device than the storage device 130a. For example, if the storage device 130a is a SCM, the storage device 130b may be an SSD or an HDD. Similarly, if the storage device 130a is an SSD, the storage device 130b may be an HDD. Data associated with a processing operation may be initially moved from the DRAM 120 to the storage device 130a subsequent to the predetermined time 106a, and then moved to the storage device 130b from the storage device 130a if the processing operation remains inactive. For example, data 114a may be stored in the storage device 130a after being migrated from the chip 122a subsequent to the processing operation 112a being inactive for the predetermined time 106a. The processing operation 112a may then remain inactive for another period of time, such as predetermined time 106b. The predetermined time 106b may be longer than the predetermined time 106a. For example, the predetermined time 106b may be five minutes. If the processing operation 112a remains inactive for the predetermined time 106b, the processor 102 can migrate the data 114a from the storage device 130a to the storage device 130b. Space in the storage device 130a can then become available for storing more-recent data from the user device 110. If the storage device 130b is an SSD, the processor 102 can put a limit on a number of writes per hour for the SSD to reduce effects of write amplification on the SSD.

The processor 102 may determine that the processing operation 112*a* becomes active while the data 114*a* is stored in the storage device 130*b*. The processor 102 can migrate the data 114*a* from the storage device 130*b* to the chip 122*b* and resume power to the chip 122*b* to resume performing the processing operation 112*a*. The processor 102 may alternatively predict that the processing operation 112*a* is likely to be resumed and migrate the data 114*a* to the storage device 130*a*. This may allow the data 114*a* to be quickly migrated to the chip 122*a* if the processing operation 112 becomes active.

FIG. 1 is illustrative and non-limiting. Other examples may include more components, fewer components, different components, or a different arrangement of the components shown in FIG. 1. For example, although the user device 110 includes two storage devices in the example of FIG. 1, the user device 110 may include a smaller or larger number of storage devices in other examples. Additionally, while the description of FIG. 1 describes two processing operations and two chips on the DRAM, other examples may include a larger number of processing operations or chips on the DRAM.

Figure 2:
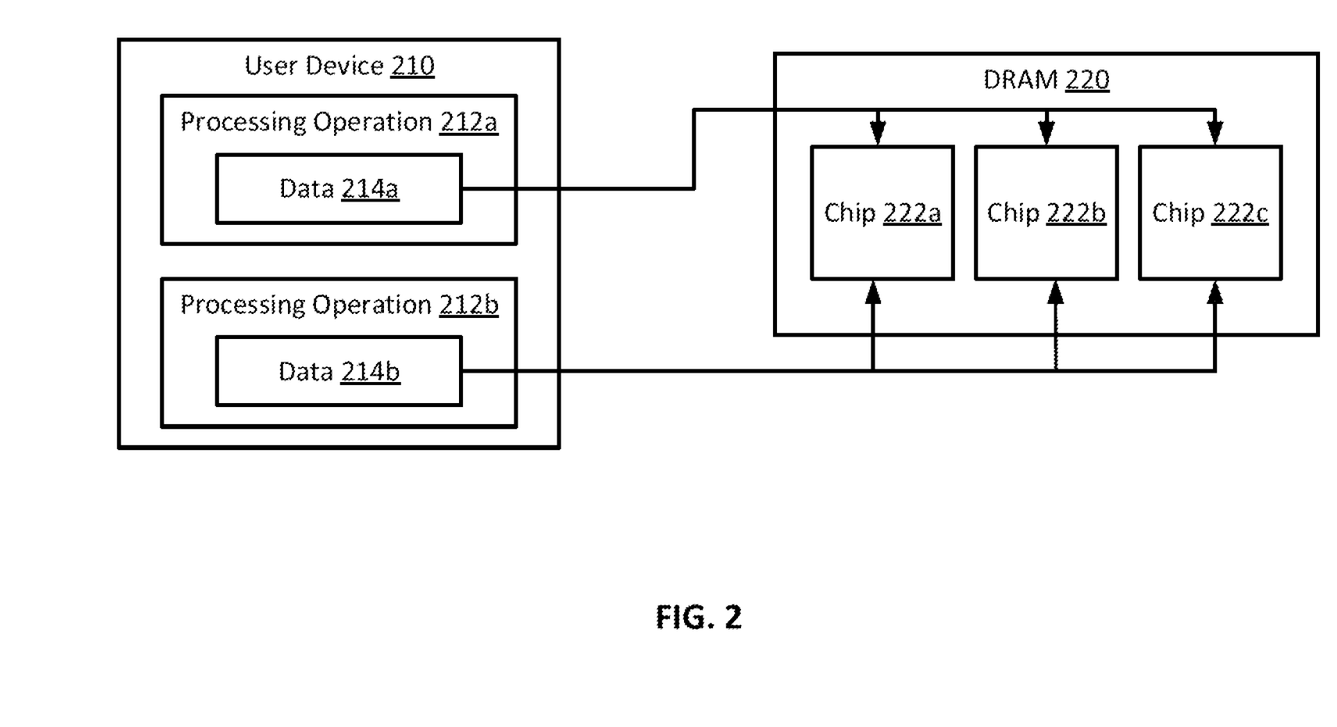
FIG. 2 is a block diagram of an example of data allocation on a dynamic random access memory (DRAM) according to some aspects of the present disclosure.
Figure 3:
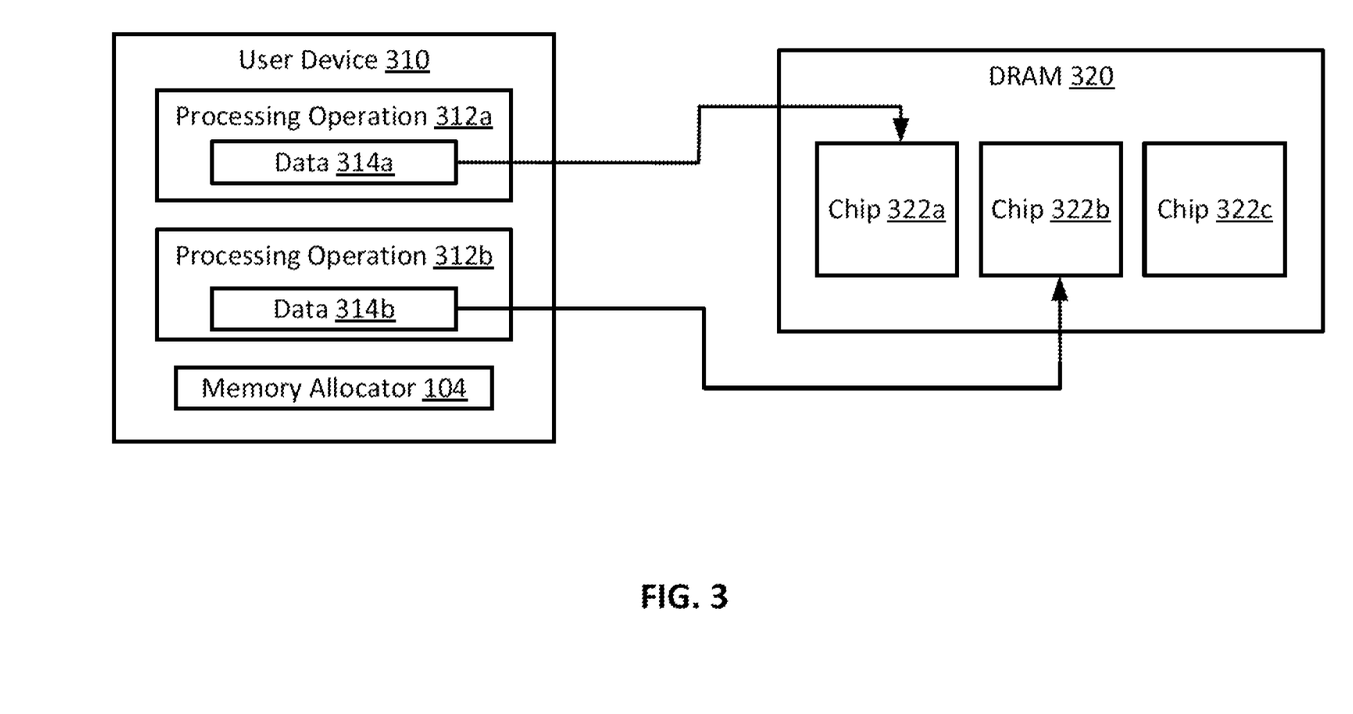
FIG. 3 is a block diagram of another example of data allocation on a dynamic random access memory (DRAM) according to some aspects of the present disclosure.

FIGS. 2-3 are block diagrams of examples of data allocation on a DRAM, according to some aspects of the present disclosure. FIG. 2 represents typical allocation of data on a DRAM, and FIG. 3 represents allocation by a memory allocator, such as the memory allocator 104.

In FIG. 2, a user device 210 includes a DRAM 220 with chips 222*a*-*c*. The user device 210 performs processing operations 212*a*-*b*, which are associated with data 214*a*-*b*, respectively. The data 214*a*-*b* is distributed randomly across the chips 222*a*-*c* of the DRAM 220. In this configuration, if processing operation 212*a* becomes inactive, chips of the DRAM 220 cannot be selectively hibernated. This is because even if data 214*a* is migrated to another storage device, data 214*b* associated with the processing operation 212*b*, which remains active, is stored on the chips 222*a*-*c*, so the chips 222*a*-*c* need power to continue execution of the processing operation 212*b*.

FIG. 3 includes a user device 310 that can selectively hibernate chips of a DRAM 320. The user device 310 performs processing operations 312*a*-*b*, which are associated with data 314*a*-*d*, respectively. The memory allocator 104 can allocate the data 314*a* to a first chip, such as chip 322*a*, of the DRAM 320 and the data 314*b* to a second chip, such as chip 322*b*, of the DRAM 320. If the processing operation 312*a* becomes inactive and the data 314*a* is migrated to a storage device, chip 322*a* no longer needs power to continue execution of the processing operation 312*b*, since the data 314*b* is stored in the chip 322*b*. As a result, the chip 322*a* can be hibernated to conserve power of the user device 310 until the processing operation 312*a* is resumed or terminated.

Figure 4:
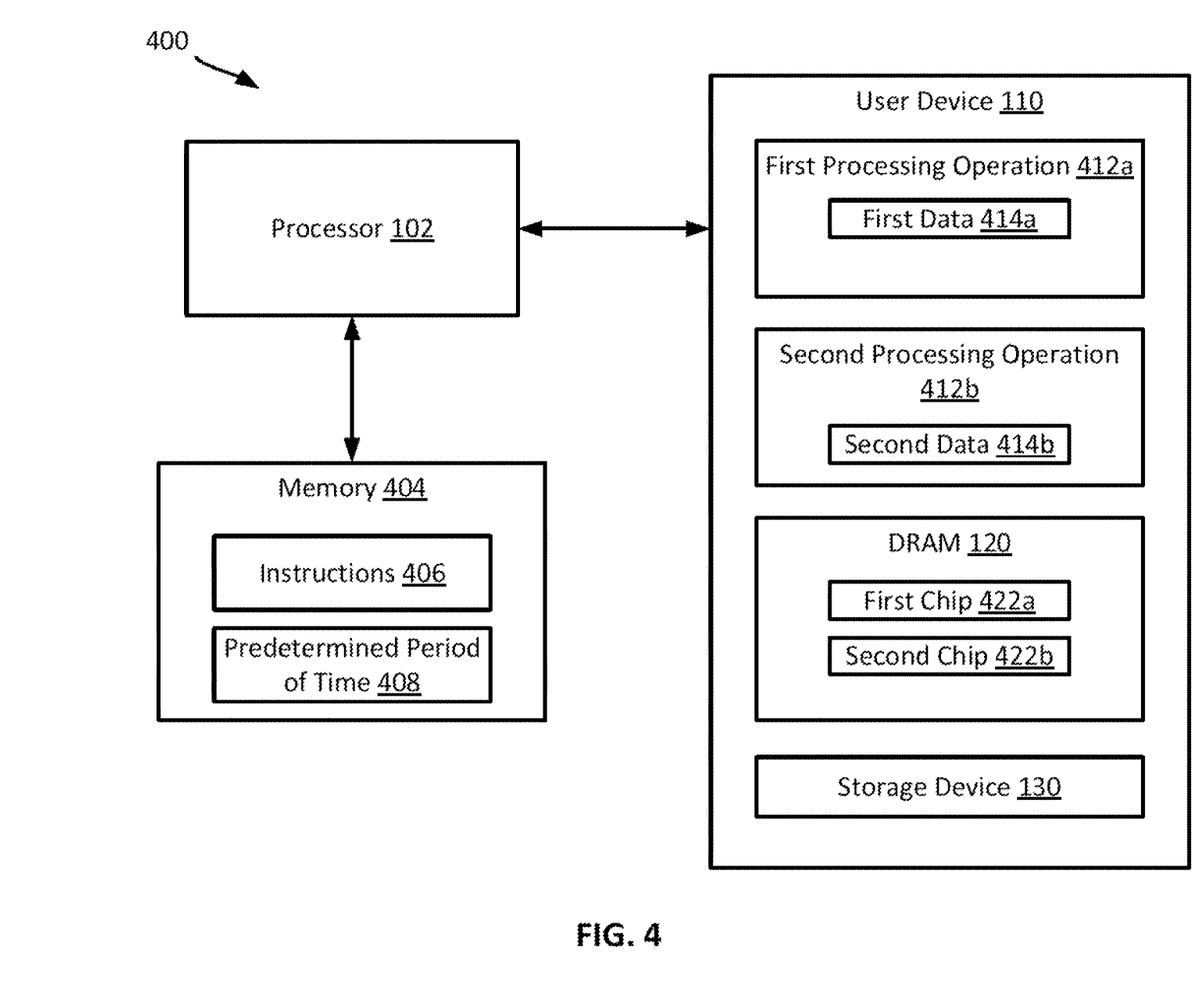
FIG. 4 is a block diagram of another system for implementing power consumption reduction by selective memory chip hibernation according to some aspects of the present disclosure.

FIG. 4 is a block diagram of another system 400 for implementing power consumption reduction by selective memory chip hibernation according to some aspects of the present disclosure. The system 400 includes a user device 110 that is communicatively coupled to a processor 102 and a memory 404. The processor 102 and the memory 404 may be part of the user device 110.

The processor 102 can include one processor or multiple processors. Non-limiting examples of the processor 402 include a Field-Programmable Gate Array (FPGA), an application-specific integrated circuit (ASIC), a microprocessor, etc. The processor 102 can execute instructions 406 stored in the memory 404 to perform operations. The instructions 406 may include processor-specific instructions generated by a compiler or an interpreter from code written in any suitable computer-programming language, such as C, C++, C#, etc.

The memory 404 can include one memory or multiple memories. The memory 404 can be non-volatile and may include any type of memory that retains stored information when powered off. Non-limiting examples of the memory 404 include electrically erasable and programmable read-only memory (EEPROM), flash memory, or any other type of non-volatile memory. At least some of the memory 404 can include a non-transitory computer-readable medium from which the processor 102 can read instructions 406. A computer-readable medium can include electronic, optical, magnetic, or other storage devices capable of providing the processor 102 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 406.

In some examples, the processor 102 can execute the instructions 406 to perform operations. For example, the processor 102 can allocate first data 414*a* associated with a first processing operation 412*a* of the user device 110 to a first chip 422*a* of a DRAM 120 of the user device 110. The processor 102 can allocate second data 414*b* associated with a second processing operation 412*b* of the user device 110 to a second chip 422*b* of the DRAM 120 of the user device 110. Examples of the processing operations 412*a*-*b* can include webpages, applications, or any other processes executed by the user device 110. The processor 102 can determine the first processing operation 412*a* has been inactive for a predetermined period of time 408. For example, the predetermined period of time 408 may be ten seconds. The processor 102 can then migrate the first data 414*a* from the first chip 422*a* of the DRAM 120 to a storage device 130 of the user device 110. The storage device 130 may be an SCM, an SSD, an HDD, and the like. The processor 102 can hibernate the first chip 422*a* of the DRAM 120 while maintaining power to the second chip 422*b* of the DRAM 120 for continuing to perform the second processing operation 412*b*.

Figure 5:
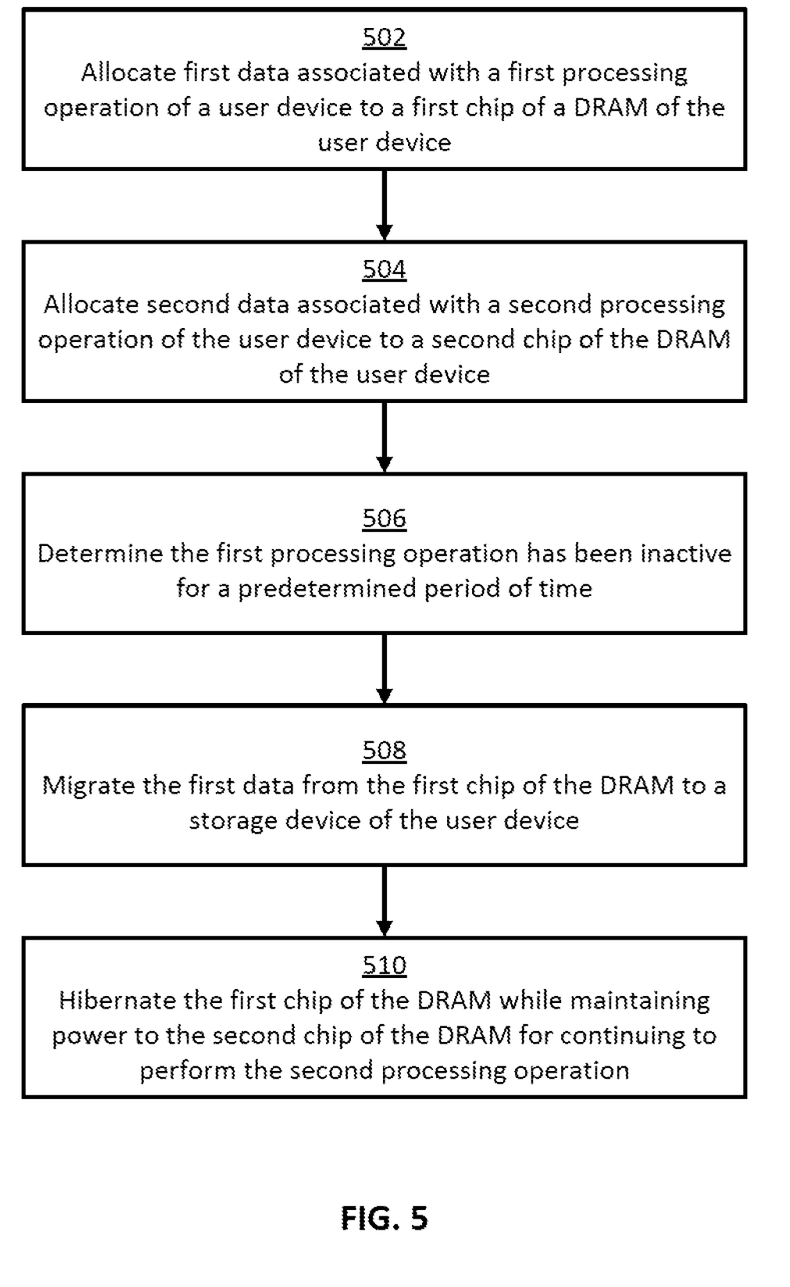
FIG. 5 is a flowchart of a process for implementing power consumption reduction by selective memory chip hibernation according to some aspects of the present disclosure.

The processor 102 can implement some or all of the steps shown in FIG. 5. Other examples can include more steps, fewer steps, different steps, or a different order of the steps than is shown in FIG. 5. The steps of FIG. 5 are discussed below with reference to the components discussed above in relation to FIG. 4.

In block 502, the processor 102 allocates first data 414*a* associated with a first processing operation 412*a* of a user device 110 to a first chip 422*a* of a DRAM 120 of the user device 110. The user device 110 may be a mobile phone, a laptop computer, a desktop computer, a server, or any other battery-powered device. The first processing operation 412*a* may be a webpage in a first tab of a browser on the user device 110. A memory allocator of the processor 102, such as memory allocator 104 in FIG. 1, can allocate the first data 414*a* to the first chip 422*a*.

In block 504, the processor 102 allocates second data 414*b* associated with a second processing operation 412*b* of the user device 110 to a second chip 422*b* of the DRAM 120 of the user device 110. The second chip 422*b* can be different from the first chip 422*a*. The memory allocator can allocate the second data 414*b* to the second chip 422*b*. The second processing operation 412*b* may be another webpage in a second tab of the browser on the user device 110.

In block 506, the processor 102 determines the first processing operation 412*a* has been inactive for a predetermined period of time 408. The predetermined period of time 408 may be based on a type of processing operation associated with the second processing operation 412b, or a type of storage device associated with a storage device 130 of the user device 110. The predetermined period of time 408 may be between several seconds and several minutes. The processor 102 can determine inactivity based on a time when the first processing operation 412a was last displayed on a user interface of the user device 110, accessed, interacted with, or other indication of the first processing operation 412a being a background operation rather than a foreground operation.

In block 508, the processor 102 migrates the first data 414a from the first chip 422a of the DRAM 120 to the storage device 130 of the user device 110. The storage device 130 may be an SCM, or another type of storage device. Migrating the data may involve the processor 102 allocating space in the storage device 130 for the first data 414a and then moving the first data 414a from the first chip 422a to the storage device 130. With the first data 414a migrated to the storage device 130, there may no longer be any data stored in the first chip 422a.

In block 510, the processor 102 hibernates the first chip 422a of the DRAM 120 while maintaining power to the second chip 422b of the DRAM 120 for continuing to perform the second processing operation 412b. Hibernating the first chip 422a may involve completely or partially shutting down power to the first chip 422a. This can reduce the power involved in refresh cycles of the DRAM 120, and thus conserve power consumed by the user device 110. The first data 414a may additionally be migrated to other storage devices of the user device 110 after subsequent time of inactivity for the first processing operation 412a to further improve data management. If the first processing operation 412a resumes activity, the processor 102 can restore power to the first chip 422a and migrate the first data 414a to the first chip 422a to be used by the first processing operation 412a.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

What is claimed is:

1. A system comprising:
   a processor; and
   a memory including instructions that are executable by the processor for causing the processor to:
   allocate first data associated with a first processing operation of a user device to a first chip of a dynamic random access memory (DRAM) of the user device;
   allocate second data associated with a second processing operation of the user device to a second chip of the DRAM of the user device;
   determine the first processing operation has been inactive for a predetermined period of time;
   migrate the first data from the first chip of the DRAM to a storage device of the user device; and
   hibernate the first chip of the DRAM while maintaining power to the second chip of the DRAM for continuing to perform the second processing operation.

2. The system of claim 1, wherein the memory further includes instructions that are executable by the processor for causing the processor to:
   determine, with the first data associated with the first processing operation being stored in the storage device, that the first processing operation becomes active;
   migrate the first data from the storage device to the first chip; and
   resume power to the first chip of the DRAM.

3. The system of claim 1, wherein the memory further includes instructions that are executable by the processor for causing the processor to:
   determine a type of processing operation associated with the second processing operation; and
   determine the predetermined period of time based on the type of processing operation,
   wherein a first type of processing operation is associated with a different predetermined period of time than a second type of processing operation.

4. The system of claim 1, wherein the memory further includes instructions that are executable by the processor for causing the processor to:
   determine a type of storage device corresponding to the storage device; and
   determine the predetermined period of time based on the type of storage device,
   wherein a first type of storage device is associated with a different predetermined period of time than a second type of storage device.

5. The system of claim 1, wherein the predetermined period of time is a first predetermined period of time, the storage device is a first storage device, and the memory further includes instructions that are executable by the processor for causing the processor to:
   determine the first processing operation remains inactive for a second predetermined period of time subsequent to the first data being stored in the first storage device; and
   migrate the first data to a second storage device that is slower and less expensive than the first storage device.

6. The system of claim 5, wherein the memory further includes instructions that are executable by the processor for causing the processor to:
   determine, with the first data associated with the first processing operation being stored in the second storage device, that the first processing operation becomes active;
   migrate the first data from the second storage device to the first chip; and
   resume power to the first chip of the DRAM to resume performing the first processing operation.

7. The system of claim 1, wherein the storage device comprises a storage class memory.

8. A method comprising:
   allocating first data associated with a first processing operation of a user device to a first chip of a dynamic random access memory (DRAM) of the user device;
   allocating second data associated with a second processing operation of the user device to a second chip of the DRAM of the user device;
   determining the first processing operation has been inactive for a predetermined period of time;
   migrating the first data from the first chip of the DRAM to a storage device of the user device; and
   hibernating the first chip of the DRAM while maintaining power to the second chip of the DRAM for continuing to perform the second processing operation.

9. The method of claim 8, further comprising:
determining, with the first data associated with the first processing operation being stored in the storage device, that the first processing operation becomes active;
migrating the first data from the storage device to the first chip; and
resuming power to the first chip of the DRAM.

10. The method of claim 8, further comprising:
determining a type of processing operation associated with the second processing operation; and
determining the predetermined period of time based on the type of processing operation,
wherein a first type of processing operation is associated with a different predetermined period of time than a second type of processing operation.

11. The method of claim 8, further comprising:
determining a type of storage device corresponding to the storage device; and
determining the predetermined period of time based on the type of storage device,
wherein a first type of storage device is associated with a different predetermined period of time than a second type of storage device.

12. The method of claim 8, wherein the predetermined period of time is a first predetermined period of time, the storage device is a first storage device, and the method further comprises:
determining the first processing operation remains inactive for a second predetermined period of time subsequent to the first data being stored in the first storage device; and
migrating the first data to a second storage device that is slower and less expensive than the first storage device.

13. The method of claim 12, further comprising:
determining, with the first data associated with the first processing operation being stored in the second storage device, that the first processing operation becomes active;
migrating the first data from the second storage device to the first chip; and
resuming power to the first chip of the DRAM to resume performing the first processing operation.

14. The method of claim 8, wherein the storage device comprises a storage class memory.

15. A non-transitory computer-readable medium comprising program code that is executable by a processor for causing the processor to:
allocate first data associated with a first processing operation of a user device to a first chip of a dynamic random access memory (DRAM) of the user device;
allocate second data associated with a second processing operation of the user device to a second chip of the DRAM of the user device;
determine the first processing operation has been inactive for a predetermined period of time;
migrate the first data from the first chip of the DRAM to a storage device of the user device; and
hibernate the first chip of the DRAM while maintaining power to the second chip of the DRAM for continuing to perform the second processing operation.

16. The non-transitory computer-readable medium of claim 15, further comprising program code that is executable by the processor for causing the processor to:
determine, with the first data associated with the first processing operation being stored in the storage device, that the first processing operation becomes active;
migrate the first data from the storage device to the first chip; and
resume power to the first chip of the DRAM.

17. The non-transitory computer-readable medium of claim 15, further comprising program code that is executable by the processor for causing the processor to:
determine a type of processing operation associated with the second processing operation; and
determine the predetermined period of time based on the type of processing operation,
wherein a first type of processing operation is associated with a different predetermined period of time than a second type of processing operation.

18. The non-transitory computer-readable medium of claim 15, further comprising program code that is executable by the processor for causing the processor to:
determine a type of storage device corresponding to the storage device; and
determine the predetermined period of time based on the type of storage device,
wherein a first type of storage device is associated with a different predetermined period of time than a second type of storage device.

19. The non-transitory computer-readable medium of claim 15, wherein the predetermined period of time is a first predetermined period of time, the storage device is a first storage device, and the non-transitory computer-readable medium further comprises program code that is executable by the processor for causing the processor to:
determine the first processing operation remains inactive for a second predetermined period of time subsequent to the first data being stored in the first storage device; and
migrate the first data to a second storage device that is slower and less expensive than the first storage device.

20. The non-transitory computer-readable medium of claim 19, further comprising program code that is executable by the processor for causing the processor to:
determine, with the first data associated with the first processing operation being stored in the second storage device, that the first processing operation becomes active;
migrate the first data from the second storage device to the first chip; and
resume power to the first chip of the DRAM to resume performing the first processing operation.

* * * * *